United States Patent [19]

Tiburtius et al.

[11] Patent Number: 4,659,753
[45] Date of Patent: Apr. 21, 1987

[54] SIZING AGENT FOR GLASS FIBERS

[75] Inventors: Christoph Tiburtius; Anna Marx; Hans-Ulrich Buschhaus, all of Cologne; Kurt Findeisen, Odenthal, all of Fed. Rep. of Germany

[73] Assignee: Bayer Aktiengesellschaft, Leverkusen, Fed. Rep. of Germany

[21] Appl. No.: 658,340

[22] Filed: Oct. 5, 1984

[30] Foreign Application Priority Data

Oct. 11, 1983 [DE] Fed. Rep. of Germany ....... 3336845

[51] Int. Cl.$^4$ ................................................ C08K 9/00
[52] U.S. Cl. ................................... 523/209; 524/494; 524/560; 524/604; 524/605; 428/378
[58] Field of Search ................. 523/501, 209; 428/378, 428/391; 524/604, 605, 591, 494, 560

[56] References Cited

U.S. PATENT DOCUMENTS

| | | | |
|---|---|---|---|
| 3,803,069 | 4/1974 | McWilliams et al. | 524/591 |
| 3,837,892 | 9/1974 | Marzocchi | 428/378 |
| 4,255,317 | 3/1981 | Coakley et al. | 428/391 |
| 4,301,052 | 11/1981 | Pollman | 428/378 |
| 4,395,444 | 7/1983 | Das et al. | 524/560 |

FOREIGN PATENT DOCUMENTS 1494891 2/1970 Fed. Rep. of Germany.
57-209856 12/1982 Japan.

OTHER PUBLICATIONS

Chemical Abstracts, Ban 98, Nr. 26, Jun. 1983, Seite 307, Nr. 220697w, Columbus, Ohio, US; & JP—A—57 209 856 (Unitika Ltd.) 23.12. 1982.
Chemical Abstracts, Band 98, Nr. 10, 7. Marz 1983, Seite 38, Nr. 73309r, Columbus, Ohio, US; & RO—A—66854 (Nicola, Grigore) 30.11.1979.

Primary Examiner—Lewis T. Jacobs
Attorney, Agent, or Firm—Sprung, Horn, Kramer & Woods

[57] ABSTRACT

In an aqueous sizing agent for glass fibers, comprising a bonding agent, a film-former and, optionally, a lubricant, wetting agent and/or other conventional additive, the improvement which comprises including therein a masked polyisocyanate which is water-soluble or dispersible. The sized glass fibers are especially useful in reinforcing polymeric products such as polyamides, giving improved physical properties.

11 Claims, No Drawings

SIZING AGENT FOR GLASS FIBERS

This invention relates to aqueous sizing agents for glass fibers, containing, in addition to the conventional constituents, low molecular weight, blocked (masked) polyisocyanates which are dispersible or soluble in water and act as cross-linking agents after a heat treatment. The present invention also relates to glass fibers which have been sized with these agents and to composite glass fiber materials obtained therefrom.

It is known to reinforce organic polymers with glass fibers in the form of cut strands, rovings or woven fabrics. Fibers of E and A glass are widely used for this purpose. Specialized types, such as C, D, R or S glass, are also used for this purpose. The synthetic polymer component used in the composite systems may be various organic polymers from which molded products may be produced, e.g. the known duromers, thermoplasts and elastomers.

In order to obtain a good reinforcing effect in the polymer matrix, the glass fibers are sized, preferably while they are being shaped during the fiber attenuation process, using a size which is compatible with the polymer and improves the adherence of the glass fibers. The properties of the glass fiber-reinforced polymer products are influenced to a great extent by the properties of the boundary layer between fiber and matrix.

Apart from the main function of the size, of providing a bond between the fiber and the matrix, it should also serve to facilitate the production and processing of the glass fibers at every stage. This means that it should exert the necessary advantageous influence, for example, on cake discharge and charging, provide protection against friction and fracture of the glass and positively influence factors which are important for manufacturing the glass product, such as bonding, rigidity and hardness of the fiber strand.

The size is generally an aqueous solution or dispersion the quantitatively major proportion of which consists of one or more film-formers, one or more bonding agents and optionally other additives, such as lubricants, wetting agents or antistatic agents (see K. L. Loewenstein: The Manufacturing Technology of Continuous Glass Fibres, Elsevier Scientific Publishing Corp. Amsterdam, London, New York, 1973).

The following are examples of film-forming polymers: polyester polymers, polyurethanes, acrylic polymers, vinyl polymers, mixtures of such polymers and copolymers of the corresponding monomers, the size containing from 1 to 15%, by weight, of a single compound or of a mixture of two or more compounds.

Suitable bonding agents are, for example, the known silane bonding agents, used singly or in combination with each each other and in quantities of from 0.1 to 1.5%, by weight, in the sizing agent.

The sizing agents used for preparing the sized glass fibers generally have a water content of from about 80 to 95% and are applied to the glass filaments in known manner, i.e. by means of suitable devices, such as spray devices or roller systems, as soon as the filaments have solidified after the attenuation thereof at high speed from the spinning dies. The sized, moist glass fibers are dried at temperatures of from 90° to 150° C. Drying means not only removal of water and other volatile constituents, but also, for example, solidification of the size components. Only after drying has been completed is the size converted into the final coating compound.

The size is generally applied in about 0.1 to 2.0, preferably about 0.4 to 1.2% by weight (on a water-free basis) of the glass fiber.

It is a widely held notion that the bonding agent anchored to the fibers is in direct contact with the reinforced polymer matrix. This model, however, represents only one of several aspects and fails to take account, for example, of the fact that the film-formers are quantitatively by far the most predominant constituent and for the most part surround the fibers, including the bonding agent. The strength of the bond between fiber and matrix provided by the bonding agent component is therefore reduced by this "barrier layer".

It depends on the particular sizing system, as well as on the polymer matrix to what extent this "barrier layer" is broken down, either by thermal degradation or physical solution in the matrix or chemical reaction when the glass fibers are incorporated in the matrix. For optimum effectiveness moreover, it is desirable that the whole size and not only the bonding agent should participate in anchoring the fibers to the polymer matrix.

It is an object of the present invention to provide glass fiber sizes which are particularly capable of influencing the production and processability of the fibers in the desired direction, of improving the bonding characteristics of a formed resin matrix in which the glass fibers are embedded for reinforcement and, in particular, of improving the reinforcing effect of glass fibers in molded polyamide products.

The present invention shows a way to new sizing agents, characterized in that water-dispersible or soluble cross-linking agents based on low molecular weight masked polyisocyanates are used by adding these substances in accordance with the present invention to the known type of sizing agent described above in proportions of from 0.1 to 5.0%, by weight, in the sizing agent. Preferred proportions are from 0.5 to 3.0%, by weight, in the sizing agent.

Particularly suitable bonding agents for the system according to the present invention are the aminosilanes as described, for example, in K. L. Loewenstein loc cit.

One particularly preferred bonding agent of this type is gamma-aminopropyl-triethoxysilane since this produces a useful bond between glass fibers and many different polymer products when used at only low, and therefore cost effective, concentrations. Other examples of bonding agents include N-beta-(aminoethyl)-gamma-amino-propyl-trimethoxysilane, gamma-ureidopropyl-triethoxysilone, beta-(3,4-epoxycyclohexyl)-ethyl-trimethoxysilane, gamma-glycidoxypropyl-trimethoxysilane, gamma-methacryloxypropyl-trimethoxysilane and vinyl-trimethoxysilane.

The water-soluble or -dispersible, blocked isocyanates used according to the present invention are known (see DE-OS No. 2,456,469 and DE-OS No. 2,853,937). They are prepared in known manner by the reaction of an organic polyisocyanate which is neither soluble nor dispersible in water and in which from 50 to 99.8%, preferably from 75 to 90%, of the isocyanate groups are blocked with an isocyanate blocking agent, with a compound containing at least one isocyanate-reactive group and at least one hydrophilic group which renders the reaction product dispersible or soluble in water.

Alternatively, the aforesaid blocked polyisocyanates may be prepared in known manner by the reaction of blocking agents for isocyanate groups with organic polyisocyanates in which from 0.2 to 50%, preferably from 10 to 25%, of the isocyanate groups have been reacted with a compound containing at least one isocyanate-reactive group and at least one hydrophilic group which renders the reaction product dispersible or soluble in water.

Various organic polyisocyanates are suitable for the process according to the present invention. It is preferred to use di- to tetra functional polyisocyanates having a molecular weight below 800 and containing aliphatically and/or cycloaliphatically-bound isocyanate groups. Particularly preferred polyisocyanates for use according to the present invention consist of tris-(isocyanatohexyl)-biuret optionally mixed with higher homologues, thereof as prepared, for example, according to DE-OS No. 2,308,015. Other particularly suitable polyisocyanates which may be used according to the present invention include 1-isocyanato-3,3,5-trimethyl-5-isocyanatomethylcyclohexane, reaction products thereof with sub-equivalent quantities of low molecular weight polyols, trimers thereof obtained by isocyanurate forms ation and dimers thereof exhibiting urethdione structures.

Apart from these preferred polyisocyanates, various other aliphatic, cycloaliphatic, araliphatic, aromatic or heterocyclic polyisocyanates, such as those described, for example, by W. Siefken in Liebigs Annalen der Chemie 562, pages 72 to 136 may be used for the purposes of the present invention.

The polyisocyanates exemplified above are used in the form of blocked polyisocyanates for the purposes of the present invention. Suitable blocking agents include in particular compounds which preferably have one isocyanate-reactive group and enter into an addition reaction with organic isocyanates at temperatures above 50° C., preferably from 60° to 100° C., to form addition products which decompose at temperatures of from 100° to 250° C., preferably from 140° to 200° C., to release the blocking agent and revert to the starting components. Suitable blocking agents of this type include, for example, the compounds used as blocking agents in DE-OS No. 2,456,469 and DE-OS No. 2,853,937, but primary alcohols, such as methanol, ethanol, butanol, hexanol or 2-ethylhexan-1-ol, may also be used. It is particularly preferred to use ε-caprolactam, methyl ethyl ketone oxime and phenol for the purposes of the present invention.

According to the present invention, the polyisocyanates may also be modified to render them hydrophilic. The compounds used for the hydrophilic modification of the exemplified polyisocyanates may be either ionic or non-ionic in structure, and combinations of ionic and non-ionic compounds may also be used for this purpose.

The compounds containing at least one isocyanate-reactive hydrogen atom and at least one hydrophilic group used according to the present invention may be, for example, polyaminosulphonic acids and/or monohydroxy polyalkylene oxides within the molecular weight range of from 500 to 5000.

The advantages of the sizes according to the present invention and sized glass fibers may be attributed to the particular nature of the blocked polyisocyanates added.

Since the temperature at which the blocked polyisocyanates split up to revert to the starting isocyanates may be controlled over a wide range, there are two main choices open. If the main object is to influence the immediate properties of the sized glass fibers, such as wet strength, chemical resistance, water absorption, bond strength or rigidity, it will be suitable to choose reversion temperatures lying in the range at which the glass fibers dry (from 90° to 150° C.). Cross-linking reactions then occur only between the components of the size.

Another major advantage of using the above-mentioned polyisocyanates in the sizing agent resides in the possibility of adjusting the temperature for reversion to the isocyanate in the region above 150° C., so that the masked polyisocyanates are preserved as such on the glass fibers after drying of the fibers and remain available as potential cross-linking agents. If the sized glass fibers are then made up into a composite material with a polymer matrix and the heating during production or processing of this composite material raises the temperature above the temperature at which the mask polyisocyanates split into the components thereof, reactive groups released directly at the boundary layer between glass fiber and matrix assist the bonding of the fibers to the polymer which is required to be reinforced by the fibers.

The present invention and advantageous details thereof will now be described in more detail with the aid of the following examples of practical embodiment. These examples given relate to particularly preferred embodiments of the present invention.

Figures given for parts and percentages are parts and percentages, by weight, based on solids content, unless otherwise indicated.

EXAMPLE 1

(a)

Composition of the sizing agent according to the present invention

Polyurethane film-former: 5.0%, by weight
γ-aminopropyltriethoxysilane: 0.5%, by weight
Polyisocyanate dispersion A: 1.2%, by weight
Lubricant: 0.56%, by weight
Water: up to 100.

(b)

Preparation of polyisocyanate dispersion A 11.08 kg of an ethylene oxide polyether started on butanol, molecular weight 2000, (5.54 OH equiv.) are melted at 90° C., and 15.18 kg of a hexamethylene diisocyanate biuret (83.06 isocyanate equiv.) (isocyanate content: 22.98%) are added and the mixture is stirred for 3 hours at 90° C. (isocyanate content calculated: 12.40%), observed 12.31%).

6.74 kg of methyl ethyl ketone oxime (77.47 OH equiv.) are added within 1 hour at such a rate that the temperature is maintained at 90° C. with moderate cooling. After this addition, the reaction mixture is stirred for 1 hour at 90° C. and cooled to 60° C., and 77.00 kg of water are added. A low viscosity, milky dispersion is obtained.
solids content: 30.0%
Blocked NCO: 2.96% (based on solution)
$n_{20° C.}$: 37 cP.

(c)

Preparation of the sizing agent

Most of the water required is introduced into a mixing vessel and the bonding agent is added with stirring. The film-former, lubricant and polyisocyanate dispersion are then added one after the other with constant stirring. After addition of the remaining water, the pH of the size is adjusted to about 5.5 using acetic acid.

(d)

Testing the reinforcing effect of glass fibers which have been sized according to the present invention The glass fibers (E glass) sized as described above and dried at 130° C. for 9 hours are cut into strands 6 mm in length each consisting of 800 individual threads having a diameter of 11μ and the cut strands are incorporated in Polyamide 6 (Durethan B 31 F, Bayer AG) in a double shaft extruder, the glass content in the glass fibre-reinforced polyamide amounting to 30%. Test samples of this material are prepared on an injection molding machine and the mechanical properties of the samples are tested according to the standard regulations mentioned:

Impact strength: DIN 53 453; 70.6 KJ/m$^2$.
Flexural strength: DIN 53 452; 292 MPa.

EXAMPLE 2

A sizing agent is prepared as in Example 1, except that it contains only 0.8%, by weight, of polyisocyanate dispersion A. Preparation of the size, the sizing process, etc., and testing of the glass fibers according to the present invention for reinforcing effect in the polyamide are carried out as described in Example 1. The following mechanical properties result:

Impact strength: DIN 53 453; 66.7 kJ/m$^2$.
Flexural strength: DIN 53 452; 287 MPa.

EXAMPLE 3

Example 1 is repeated with the following alteration: Drying is carried out in two stages, first at 130° C. for 6 hours, then at 150° C. for 4 hours. The tests produce the following results:

Impact strength: DIN 53 453; 67.6 kJ/m$^2$.
Flexural strength: DIN 53 452; 292 MPa.

EXAMPLE 4

(Comparison)

A sizing agent not according to the present invention is obtained by omitting the polyisocyanate dispersion A added in Examples 1 to 3. Glass fibers are again treated with this sizing agent as in Examples 1 and 2 and tested.

Impact strength: DIN 53 453; 63.9 kJ/m$^2$.
Flexural strength: DIN 53 452; 279 MPa.

EXAMPLE 5

(Comparison)

The following results are obtained on test samples of Polyamide 6 (urethane B 31 F), which has been reinforced with 30% of ordinary commercial E glass in the form of cut strands (length 6 mm):

Impact strength; DIN 53 453; 62.1 kJ/m$^2$.
Flexural strength: DIN 53 452; 251 MPa.

The results of Examples 1 to 5 confirm the superiority of the glass fibers and sizing agents according to the present invention.

The following Examples 6 and 7 describe further sizing agents according to the present invention.

EXAMPLE 6

The procedure is the same as in Example 1, except that 1.2%, by weight, of polyisocyanate dispersion B is used instead of dispersion A.

Preparation of polyisocyanate dispersion B 19.90 kg (108.88 isocyanate equiv.) of a hexamethylene diisocyanate biuret (NCO content 22.98%) are introduced into the reaction vessel at 90° C. and 10.30 kg (91.15 mol) of caprolactam are added within 1 hour and the reaction mixture is then stirred for 1 hour at 90° C. (isocyanate content calculated: 2.47%, observed: 2.44%). The reaction mixture is cooled to 60° C., and a solution of 1.73 kg of the sodium salt of 2-(2-aminoethyl)-aminoethane sulphonic acid (18.21 equiv.) in 7.06 kg of water is added and the reaction mixture is stirred for 1 hour at 60° C. The mixture is diluted with 67.44 kg of water.

A low viscosity, opaque dispersion is obtained.
Solids content: 30.0%
Blocked NCO: 3.60% (based on solution)
SO$_3$ content: 0.67% (based on solution
20° C.: 90 cP.
The following test values are obtained:
Impact strength: DIN 53 453; 70.3 kJ/m$^2$.
Flexural strength: DIN 53 452; 291 MPa.

EXAMPLE 7

The procedure is the same as in Example 1, except that 1.2%, by weight, of polyisocyanate dispersion C is used instead of dispersion A.

Preparation of polyisocyanate dispersion C 891.4 g of a hexamethylene diisocyanate biuret (5.12 isocyanate equiv.) (isocyanate content: 24.14%) and 1708 g of an ethylene oxide polyether started on butanol (molecular weight 2000 (0.85 OH equiv.) are stirred together at 100° C. for 3 hours, 401.6 g (4.27 OH equiv.) of distilled phenol are added within 30 minutes, and the reaction mixture is stirred for 1 hour at 90° C. It is then dispersed with 7000 g of water.

A low viscosity, milky dispersion is obtained.
Solids content: 30.0%,
Blocked NCO: 1.79% (based on solution).

The sized glass fibers produce the following properties by reinforcement:
Impact strength: DIN 53 453; 69.5 kJ/m$^2$.
Flexural strength: DIN 53 452; 287 MPa.

These examples also demonstrate the advantageous properties of the glass fibers and sizing agents according to the present invention.

It will be understood that the specification and examples are illustrative but not limitative of the present invention and that other embodiments within the spirit and scope of the invention will suggest themselves to those skilled in the art.

We claim:

1. In an aqueous sizing agent for glass fibers comprising
   (a) a film-forming polymer,
   (b) a silane or siloxane bonding agent, and
   (c) optionally a lubricant, wetting agent and/or other conventional additives, the improvement which comprises including therein as a cross-linking agent a water-soluble or water-dispersible blocked polyisocyanate and blocked polyisocyanate being prepared from tris-(iscyanatohexyl)-biuret optionally mixed with higher homologues thereof.

2. A sizing agent according to claim 1 wherein the water-soluble or water-dispersible blocked polyisocyanate is selected from a blocked isocyanate prepared by the reaction of said biuret with an isocyanate blocking agent, wherein said blocking agent contains at least one isocyanate-reactive group and at least one hydrophilic group which renders the reaction product dispersible or soluble in water and a blocked isocyanate prepared by the reaction of blocking agents for isocyanate groups with said biuret in which from 0.2 to 50% of the isocyanate groups have been reacted with a compound containing at least one isocyanate-reactive group and at least one hydrophilic group which renders the reaction product dispersible or soluble in water.

3. A sizing agent according to claim 1 wherein the blocked polyisocyanate is present in proportions of from 0.1 to 5% by weight.

4. A sizing agent according to claim 1, wherein the bonding agent is aminosilane.

5. A sizing agent according to claim 1, wherein the film-forming polymer is selected from a polyester polymer, a polyurethane, a vinyl polymer, and mixtures thereof.

6. A sizing agent according to claim 5, wherein the film-forming polymer is a polyurethane.

7. A process for sizing glass fibers, comprising applying to the glass fibers a size according to claim 1.

8. Glass fibers sized with a size according to claim 1.

9. In the reinforcement of a polymeric product with sized glass fiber, the improvement which comprises employing as the reinforcement sized glass fibers, according to claim 8.

10. A polymeric product reinforced with sized glass fibers according to claim 8.

11. A product according to claim 10, wherein the polymeric product is a polyamide.

* * * * *